(12) United States Patent
Ueno

(10) Patent No.: US 10,272,626 B2
(45) Date of Patent: Apr. 30, 2019

(54) TIRE VULCANIZATION MOLD AND PNEUMATIC TIRE

(71) Applicant: TOYO TIRE & RUBBER CO., LTD., Itami-shi, Hyogo (JP)

(72) Inventor: Tomonori Ueno, Itami (JP)

(73) Assignee: TOYO TIRE & RUBBER CO., LTD., Hyogo (JP)

( * ) Notice: Subject to any disclaimer, the term of this patent is extended or adjusted under 35 U.S.C. 154(b) by 0 days.

(21) Appl. No.: 15/730,122

(22) Filed: Oct. 11, 2017

(65) Prior Publication Data
US 2018/0169984 A1 Jun. 21, 2018

(30) Foreign Application Priority Data
Dec. 16, 2016 (JP) ................................. 2016-244692

(51) Int. Cl.
*B29D 30/06* (2006.01)
(52) U.S. Cl.
CPC ..... *B29D 30/0629* (2013.01); *B29D 30/0662* (2013.01); *B29D 2030/063* (2013.01); *B29D 2030/0612* (2013.01); *B29D 2030/0667* (2013.01)
(58) Field of Classification Search
CPC ............ B29D 30/0606; B29D 30/0629; B29D 30/0662; B29D 2030/0612; B29C 33/005
See application file for complete search history.

(56) References Cited

U.S. PATENT DOCUMENTS

| | | | | |
|---|---|---|---|---|
| 1,416,362 A | * | 5/1922 | Lambert ............ | B29D 30/0629 425/46 |
| 1,673,525 A | * | 6/1928 | Nelson ............... | B29D 30/0629 425/36 |
| 3,901,632 A | * | 8/1975 | Prosdocimi ........ | B29D 30/0629 425/39 |
| 4,553,918 A | * | 11/1985 | Yoda .................. | B29D 30/0606 425/46 |
| 4,655,699 A | * | 4/1987 | Collier ............... | B29C 33/0055 425/28.1 |
| 5,769,976 A | * | 6/1998 | Omokawa .......... | B29C 33/0038 152/209.18 |
| 8,192,670 B2 | * | 6/2012 | Yasunaga .......... | B29D 30/0629 264/326 |
| 9,815,250 B2 | * | 11/2017 | Ohara ................ | B29D 30/0606 |

(Continued)

FOREIGN PATENT DOCUMENTS

JP 63-66206 U 5/1988
JP 2014-113743 * 6/2014

*Primary Examiner* — James P Mackey
(74) *Attorney, Agent, or Firm* — Westerman, Hattori, Daniels & Adrian, LLP

(57) ABSTRACT

A tire vulcanization mold including a sector mold divided into a plurality of pieces along a circumferential direction of a green tire, the sector mold configured to vulcanization mold a tread portion of the green tire into a predetermined shape, and an upper mold and a lower mold disposed on both sides of the green tire so as to sandwich the green tire therebetween in an axial direction of the green tire, the upper mold and the lower mold configured to vulcanization mold a side portion of the green tire into a predetermined shape. The sector mold has a relief groove in a vicinity of a fitting portion between the sector mold, and the upper mold and the lower mold.

9 Claims, 5 Drawing Sheets

(56) References Cited

U.S. PATENT DOCUMENTS

| | | | |
|---|---|---|---|
| 2004/0018262 A1* | 1/2004 | Reep | B29D 30/0629 |
| | | | 425/35 |
| 2008/0178990 A1* | 7/2008 | Menard | B29C 33/305 |
| | | | 156/110.1 |
| 2015/0050376 A1* | 2/2015 | Ferrand | B29C 33/20 |
| | | | 425/47 |
| 2016/0375644 A1* | 12/2016 | Massoptier-David | ........ |
| | | | B29D 30/0662 |
| | | | 264/326 |

* cited by examiner

TIRE VULCANIZATION MOLD AND PNEUMATIC TIRE

CROSS-REFERENCE TO RELATED APPLICATIONS

This application claims priority of Japanese Patent Application No.: 2016-244692 filed on Dec. 16, 2016, the content of which is incorporated herein by reference.

BACKGROUND OF THE INVENTION

Technical Field

The present invention relates to a tire vulcanization mold and a pneumatic tire.

Related Art

In vulcanization molding of a pneumatic tire, two kinds of molds corresponding to molded portions are generally used. One is a mold for molding a tread portion of the tire, which is called a sector mold. The other is a mold for molding a sidewall portion over a shoulder portion of the tire, which is called a side mold. The sector mold is divided into a plurality of pieces and arranged in the circumferential direction of the tire, and the side mold is arranged so as to sandwich the tire from the side. The green tire (raw tire) is subjected to vulcanization molding in a state of being closed by these two kinds of molds, and a pneumatic tire as a product is manufactured.

For example, JP 63-66206 U discloses a pneumatic tire molded by such a sector mold and a side mold. In the pneumatic tire disclosed in JP 63-66206 U, in order to prevent the rubber from being caught by a mold during molding and to prevent the poor appearance of the tire, a protrusion is provided at the bottom of the lug groove of the tire on the side mold side.

SUMMARY

In the molding of the pneumatic tire disclosed in JP 63-66206 U, a protrusion is provided at the bottom of the lug groove of the tire on the side mold side. However, the position and shape of the protrusion has not been studied in detail so as to suppress rubber from flowing to the fitting portion of the molds. Therefore, there is still room for improvement in the tire vulcanization mold disclosed in JP 63-66206 U.

An object of the present invention is to provide a tire vulcanization mold capable of suppressing a pneumatic tire from representing a poor appearance which is caused by an event in which the rubber has been caught during molding and a pneumatic tire in which such a poor appearance is suppressed.

The tire vulcanization mold of the present invention includes a sector mold divided into a plurality of pieces along the circumferential direction of a green tire, the sector mold configured to vulcanization mold the tread portion of the green tire into a predetermined shape, and a pair of side molds disposed on respective sides of the green tire so as to sandwich the green tire therebetween in the axial direction of the green tire, for the side molds configured to vulcanization mold a side portion of the green tire into a predetermined shape, wherein the sector mold has a recess in the vicinity of a fitting portion between the sector mold, and the side molds.

According to this configuration, when the mold is closed, the rubber of the tire can escape to the recess provided in the sector mold, so that the flow of the rubber to the fitting portion of the mold can be suppressed. Therefore, it is possible to suppress the rubber from being caught by the mold, and it is possible to suppress occurrence of the poor appearance of the pneumatic tire. In particular, the recess is provided in the sector mold instead of the side mold, thereby further suppressing the rubber from being caught. In detail, when the mold is closed, normally the sector mold moves inward in the radial direction of the tire in a state where the side mold is fixed. Therefore, the positional relationship between the side mold and the tire is fixed, and the rubber of the tire flows toward the closing sector mold. Therefore, the recess is provided in the sector mold and the rubber escapes to the recess, thereby suppressing the rubber from being caught in the fitting portion.

The recess may have a depth of 0.3 mm or more and 0.5 mm or less.

According to this configuration, the depth of the recess is defined, thereby further suppressing the rubber from being caught, and ensuring the releasability of the mold. Specifically, the depth of the recess is 0.3 mm or more, whereby the rubber in an amount necessary for suppressing the rubber from being caught can escape into the recess. Further, the depth of the recess is 0.5 mm or less, thereby preventing the rubber from deeply entering the recess. Therefore, it is possible to prevent the rubber from becoming difficult to be released from the mold when the mold is opened, that is, it is possible to ensure releasability of the mold.

The recess may be provided away from the fitting portion by a distance of 0.5 mm or more and 0.8 mm or less.

According to this configuration, the distance between the recess and the fitting portion is defined, thereby preventing durability of the mold from deteriorating and further suppressing the rubber from being caught. In detail, the recess is 0.5 mm or more away from the fitting portion, whereby the thickness of the sector mold in the vicinity of the fitting portion can be sufficiently ensured. Therefore, it is possible to prevent durability of the sector mold from deteriorating. Since the sector mold contacts the side mold at the fitting portion, and the sector mold is subjected to receive impact upon every molding, it is very effective to be able to prevent durability in the vicinity of the fitting portion of the sector mold from deteriorating. In addition, the recess is provided within a distance of 0.8 mm from the fitting portion, whereby the flow of the rubber to the fitting portion can be suppressed more reliably. If the recess is provided extremely far from the fitting portion, the recess does not affect the flow of the rubber toward the fitting portion, and the effect of suppressing the rubber from being caught at the fitting portion cannot be provided.

The sector mold may be provided with a projection for forming a lug groove on an outer circumferential surface of the green tire, and the recess may be provided away from the projection by a distance of 0.5 mm or more and 0.8 mm or less.

According to this configuration, the distance between the recess and the projection is defined, thereby preventing durability of the tire to be manufactured from deteriorating, and sufficiently ensuring an area for arranging the recess in the mold. In detail, the recess is 0.5 mm or more away from the projection, thereby preventing a ridge line from being formed in the vicinity of the lug groove of the tire to be manufactured. If the recess is provided extremely close to the projection, a ridge line is formed in the vicinity of the lug groove in the tire. In that case, since the lug groove and the ridge line form a protruding and recessed relation, the abrasion rate of the tire is increased. Therefore, by preventing the formation of the recess extremely close to the projection, it is possible to prevent the abrasion resistance of the tire from deteriorating, that is, deterioration of the durability of the pneumatic tire can be prevented. If the recess is provided extremely far from the projection, that is, if the recess is provided extremely close to the fitting portion, the area for providing the recess between the fitting portion and the projection is decreased. Therefore, the recess is provided within a distance of 0.8 mm from the projection, whereby the sufficient area for arranging the recess in the mold can be ensured.

The recesses may be a plurality of grooves in a mesh shape extending in a direction intersecting with both a circumferential direction and a radial direction of the green tire. The recesses may be grooves extending annularly in a circumferential direction of the green tire.

According to this configuration, the recess is provided so as to extend in a direction intersecting with the flow direction of the rubber (radial direction of the tire) to the fitting portion. Therefore, when the rubber flows to the fitting portion, the rubber stretches across the recess, so that the rubber can reliably escape to the recess. Therefore, the flow of the rubber to the fitting portion can be suppressed, and it is possible to prevent the rubber from being caught. In particular, when the recess is provided in a mesh shape, the rubber can escape in various directions, and it is possible to more reliably suppress the rubber from being caught. Particularly, when the recess is provided in the circumferential direction of the tire, since the recess can be formed by lathe machining or the like, it is easy to process the recess.

The pneumatic tire according to the present invention includes a protrusion-shaped mold fitting mark located between a tread portion and a side portion, and a protrusion-shaped molding mark provided in the vicinity of and outside of the mold fitting mark.

According to this configuration, the pneumatic tire is manufactured using the mold having said recess, thereby suppressing the rubber from being caught. Thus, occurrence of poor appearance of the pneumatic tire is suppressed. Therefore, the aesthetic appearance of the tire is maintained. Here, the vicinity of and the outside of the mold fitting mark refer to a range within, for example, 0.8 mm from the mold fitting mark on the radially outer side of the pneumatic tire.

According to the present invention, it is possible to suppress the rubber from being caught during molding in the tire vulcanization mold, and it is possible to maintain the aesthetic appearance of the pneumatic tire.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments of the present invention will be described with reference to the accompanying drawings.

Figure 1:
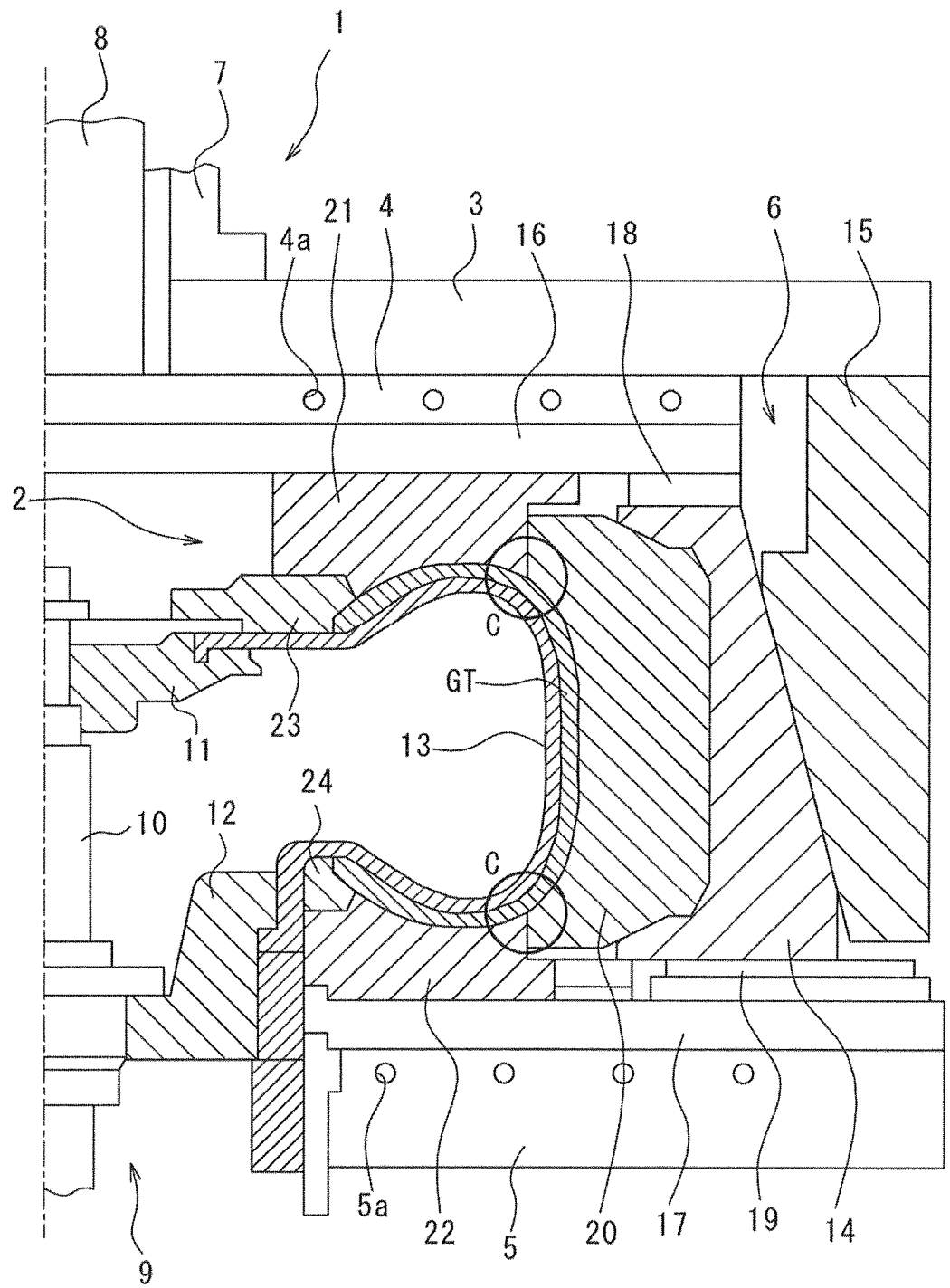
FIG. 1 is a partial sectional view of a vulcanization molding machine equipped with a tire vulcanization mold according to an embodiment of the present invention.

FIG. 1 shows a state in which a tire vulcanization mold 2 according to the present embodiment is attached to a vulcanization molding machine 1. The tire vulcanization mold 2 is attached via a container 6 between an upper plate 3 and an upper platen 4 of the vulcanization molding machine 1, and a lower platen 5.

The upper plate 3 is fixed to the lower end of a lifting cylinder 7. A lifting rod 8 is disposed at the center of the lifting cylinder 7. The upper platen 4 is fixed to the lower end of the lifting rod 8. The lifting cylinder 7 and the lifting rod 8 are moved up and down by a driving device (not shown). The upper plate 3 and the upper platen 4 are configured to be able to move up and down independently. A flow path 4a is formed in the upper platen 4. The temperature can be adjusted by the flow of a heat exchange medium (for example, oil) in the flow path 4a.

As with the upper platen 4, a flow path 5a in which the heat exchange medium flows is formed in the lower platen 5. Adjusting the temperature of the heat exchange medium allows the tire vulcanization mold 2 to have a desired vulcanization temperature through the upper platen 4 and the lower platen 5. A bladder unit 9 is disposed at the center of the lower platen 5.

In the bladder unit 9, a bladder 13 is attached to an upper clamp 11 and a lower clamp 12 which are fixed to a vertically movable support shaft 10. Air is supplied to and discharged from a space surrounded by the upper clamp 11, the lower clamp 12, and the bladder 13 by a supply/exhaust device (not shown). The bladder 13 is inflated toward its outer circumference side by the supply of air, and supports a green tire GT from the inside. Here, the green tire GT indicates a raw tire before being subjected to vulcanization molding.

A container 6 includes a segment 14, a jacket ring 15, an upper container plate 16, and a lower container plate 17.

The segment 14 is screwed to a sector mold 20 of the tire vulcanization mold 2 described later at each of respective pieces. In the present embodiment, the segment 14 is consisted of nine pieces, and the sector mold 20 is also consisted of nine pieces. The inner surface of the segment 14 is disposed along the outer surface of the sector mold 20, and its outer surface is constituted by an inclined surface (outer peripheral conical surface) gradually expanding toward the outer diameter side in going downward. The segment 14 is reciprocably supported in the radial direction by an upper slide 18.

A jacket ring 15 has a hollow cylindrical shape. The upper end surface of the jacket ring 15 is fixed to the upper plate 3, and the jacket ring 15 moves up and down according to the lifting action of the lifting cylinder 7. The inner surface of the jacket ring 15 is constituted by an inner peripheral conical surface inclined toward the outer diameter side so as to gradually enlarge its diameter in going toward the lower end of the jacket ring 15. The inner peripheral conical surface of the jacket ring 15 and the outer peripheral conical surface of the segment 14 slide along the conical surface so as not to be away from each other (for example, by a configuration like a tenon and a dovetail groove). As a result, when the jacket ring 15 descends, the outer peripheral conical surface of the segment 14 is pressed by the inner peripheral conical surface of the jacket ring 15, and it is possible to move the segment 14 expanding toward the outer diameter side into a state in which the pieces of the segment 14 are annularly continuously disposed on the inner diameter side.

The upper slide 18 is fixed to the undersurface of the upper container plate 16 on the outer peripheral side thereof, and an upper mold 21, which will be described later, is fixed to the undersurface of the upper container plate 16 on the inner peripheral side thereof. The upper container plate 16 itself is fixed to the undersurface of the upper platen 4. As a result, when the lifting rod 8 moves up and down, the upper mold 21 and the segment 14 (including the sector mold 20 fixed to the segment 14) move up and down together with the upper platen 4 and the upper container plate 16.

The lower slide 19 is fixed to the top surface of the lower container plate 17 on the outer peripheral side thereof, and a lower mold 22, which will be described later, is fixed to the top surface of the lower container plate 17 on the inner peripheral side thereof. On the lower slide 19, the segment 14 is placed at the time of mold clamping and is supported slidably in the radial direction. The lower container plate 17 itself is fixed to the top surface of the lower platen 5.

The tire vulcanization mold 2 includes the sector mold 20, the upper mold (side mold) 21, and the lower mold (side mold) 22.

The sector mold 20 is a mold for vulcanization molding the tread portion of the tire into a predetermined shape. The sector mold 20 is made of an aluminum alloy and is divided into a plurality of pieces in the circumferential direction of the tire (nine divisions in this case), and the pieces are continuously disposed in a ring shape in a state where the pieces are moved to the inner diameter side.

Figure 2A:
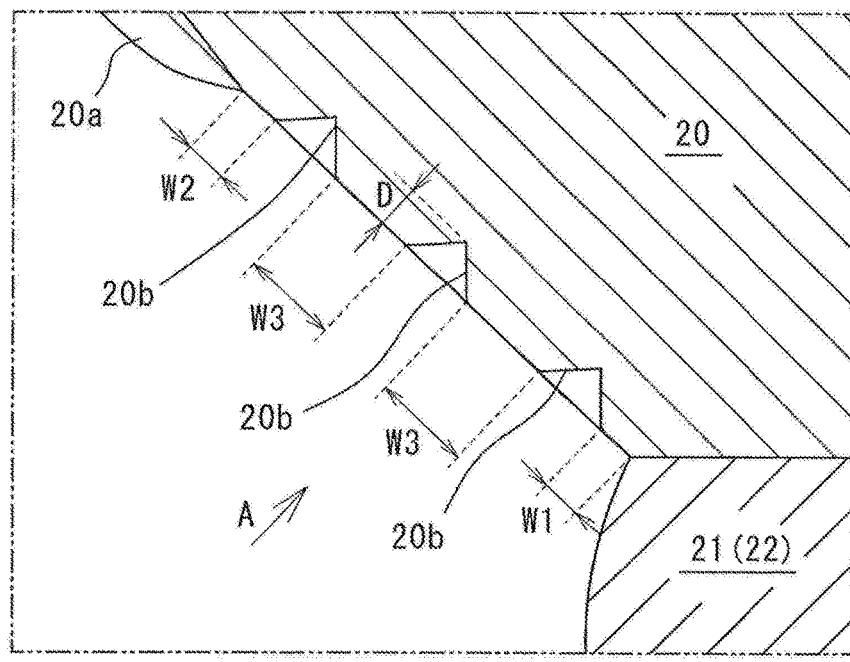
FIG. 2A is an enlarged view of a fitting portion of the tire vulcanization mold of FIG. 1.

FIG. 2A is an enlarged view of a portion surrounded by a circle C in FIG. 1, that is, FIG. 2A is an enlarged view of a fitting portion between the sector mold 20 and the upper mold 21 (or the lower mold 22). In FIG. 1, there are two portions surrounded by a circle C. Since each enlarged view of the two portions differs only in orientation and is identical in shape, the two portions are shown in FIG. 2A by one figure. Hereinafter, the term "fitting portion" refers to a fitting portion between the sector mold 20 and the upper mold 21 (or the lower mold 22). The fitting portion has a recessed shape and has a shape like an open beak. This recessed shape can suppress the rubber from being caught in the fitting portion when the mold is closed. The sector mold 20 is provided with a projection 20a for forming a lug groove on the tire surface in order to improve driveability of the tire to be manufactured and a relief groove (recess) 20b for suppressing the rubber from being caught.

Figure 2B:
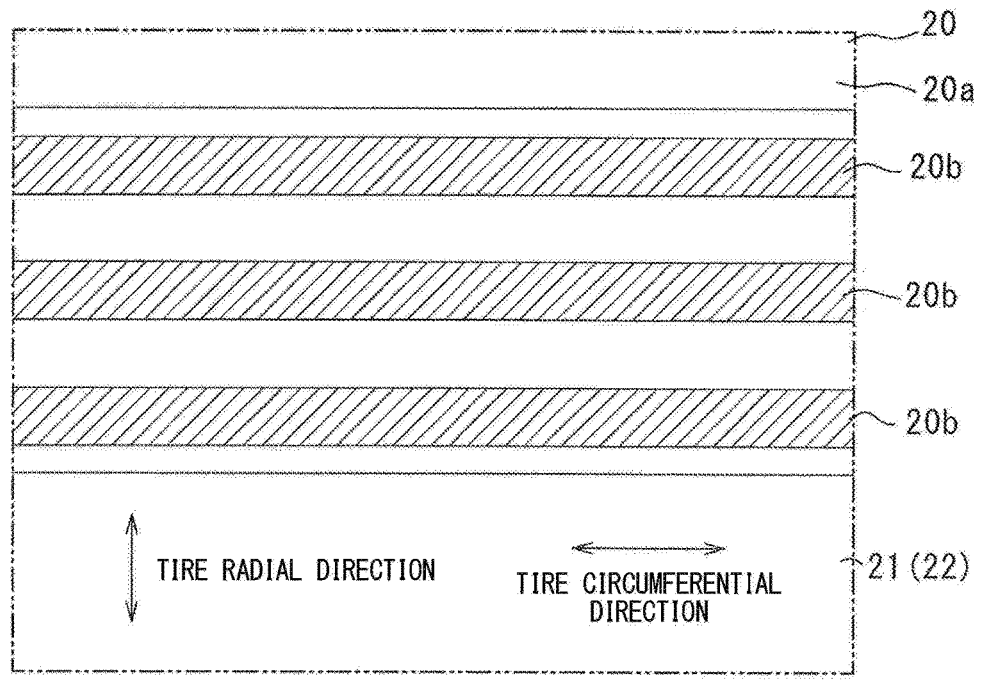
FIG. 2B is a front view of a recess of FIG. 2A.

The relief groove 20b is provided at a position, for example, 0.5 mm away from the fitting portion (W1=0.5 mm) and is provided at a position, for example, 0.5 mm away from the projection 20a (W2=0.5 mm). A plurality of relief grooves 20b is provided, and in this embodiment, three relief grooves 20b are provided. The relief groove 20b has, for example, an R portion having a radius of about 1.0 mm with respect to the surface of the sector mold 20. The interval between the relief grooves 20b is, for example, about 1.0 mm (W3=1.0 mm). As also shown in FIG. 2B seen from the direction of the arrow A in FIG. 2A, the relief groove 20b of the present embodiment extends in the circumferential direction of the tire, and the sectional shape thereof is a triangular shape. The depth of the relief groove is, for example, about 0.4 mm (D=0.4 mm). In FIG. 2B, in order to clearly show the position of the relief groove 20b, marking is schematically indicated by oblique lines with respect to the relief groove 20b.

The relief groove 20b has a preferable range of position and shape. The relief groove 20b is preferably provided at a position 0.5 mm to 0.8 mm away from the fitting portion, that is, the width W1 preferably satisfies 0.5 mm≤W1≤0.8 mm. Further, the relief groove 20b is preferably provided at a position 0.5 mm to 0.8 mm away from the projection 20a, that is, the width W2 preferably satisfies 0.5 mm≤W2≤0.8 mm. The interval between the relief grooves 20b is preferably 0.7 mm to 1.3 mm, that is, the width W3 preferably satisfies 0.7 mm≤W3≤1.3 mm. Further, the depth of the relief groove 20b is preferably 0.3 mm to 0.5 mm, that is, the depth D is preferably 0.3 mm≤D≤0.5 mm.

While the cross-sectional shape of the relief groove 20b is preferably a triangular shape, it may be any shape, such as a semicircular shape or a trapezoidal shape, for example. The significance of the preferable range of the position and the shape of the relief groove 20b will be described later.

As shown in FIG. 1, the upper mold 21 and the lower mold 22 are molds for vulcanization molding the side portions of the tire into a predetermined shape.

The upper mold 21 is formed in an annular shape, and an upper bead ring 23 is fixed to the inner periphery of the upper mold 21. The upper mold 21 is fixed to the upper container plate 16, and moves up and down as the lifting rod 8 moves up and down. When the upper mold 21 descends, the upper bead ring 23 can hold down the bead portion of the green tire GT. Thereby, a sidewall portion and a bead portion of the tire are formed by the lower inner surface of the upper mold 21 and the undersurface of the upper bead ring 23.

As with the upper mold 21, the lower mold 22 is formed in an annular shape, and a lower bead ring 24 is fixed to the inner peripheral portion of the lower mold 22.

FIGS. 3A to 3F are partial cross-sectional views showing the mold clamping operation of the tire vulcanization mold 2 of the present embodiment. In the present embodiment, the green tire GT is set in the vulcanization molding machine 1 equipped with the tire vulcanization mold 2 having the above-described configuration. After closing the mold, and the mold is clamped, the vulcanization molding of the green tire GT is performed.

Figure 3C:
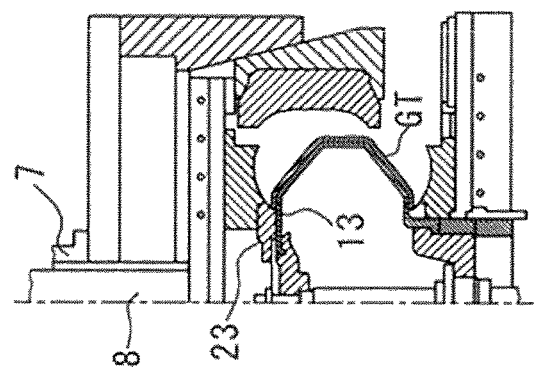
FIGS. 3A to 3F are partial sectional views showing a clamping operation of the tire vulcanization mold of FIG. 1.
Figure 3B:
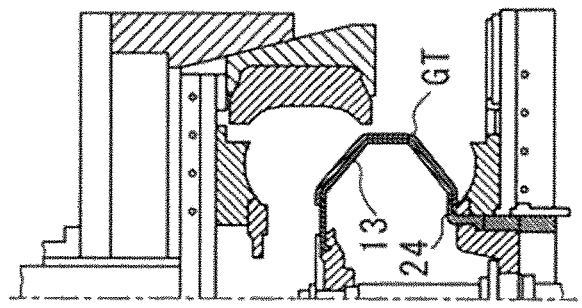
Figure 3A:
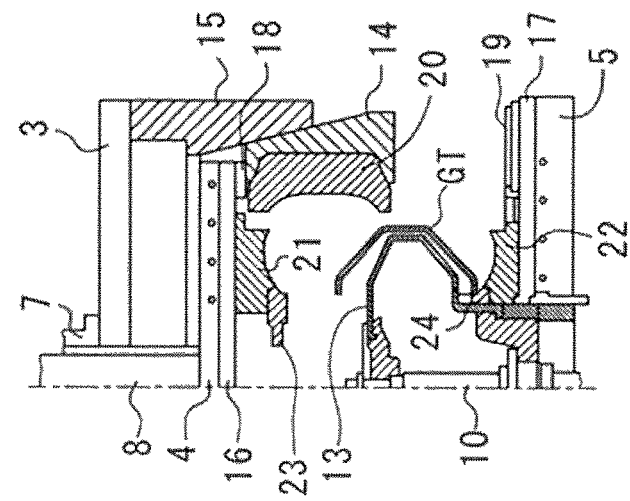

In the mold open state shown in FIG. 3A, the green tire GT is placed on the lower mold 22 so that the axial direction of the green tire GT directs upward and downward. At this time, the bead portion of the green tire GT on the lower side is aligned with the lower bead ring 24.

As shown in FIG. 3B, air is then supplied into the bladder 13 to inflate the bladder 13 and hold the inner surface of the green tire GT on the outer surface of the bladder 13. As a result, the green tire GT is supported by the lower bead ring 24 and the bladder 13, and is in a non-contact state with the lower mold 22.

As shown in FIG. 3C, the upper mold 21 and the sector mold 20 are subsequently lowered by the lifting rod 8 and the lifting cylinder 7. Then, the upper bead ring 23 comes into contact with the bead portion positioned at the upper side of the green tire GT.

Figure 3F:
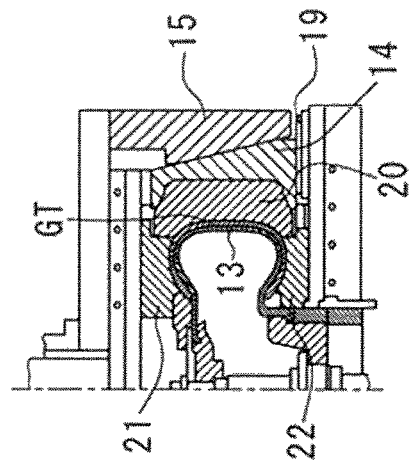
Figure 3E:
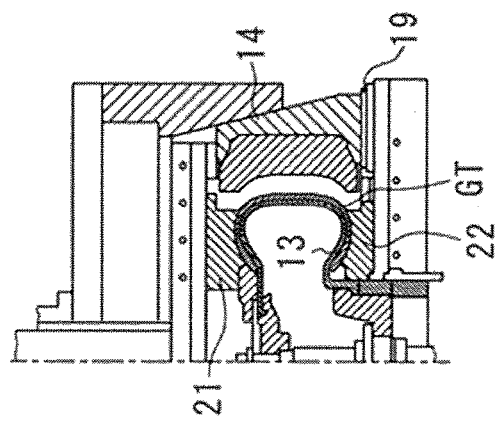
Figure 3D:
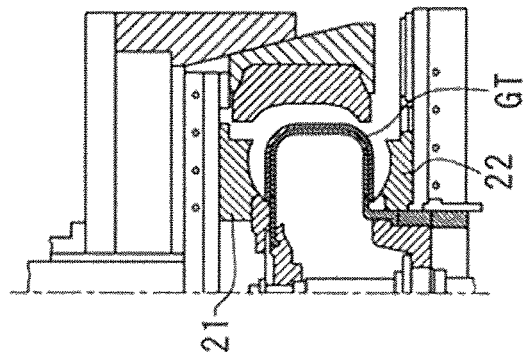

As shown in FIGS. 3D and 3E, subsequently, after the green tire GT is pressed and deformed via the bead portion, the upper mold 21 comes into contact with the green tire GT. When the upper mold 21 descends to the mold clamping completion position, the green tire GT is sandwiched between the upper mold 21 and the lower mold 22.

As shown in FIG. 3F, the descent by the lifting cylinder 7 is continued even after the upper mold 21 has descended to the mold clamping completion position, and the jacket ring 15 is downwardly moved together with the upper plate 3. As a result, the inner peripheral conical surface of the jacket ring 15 presses the outer peripheral conical surface of the segment 14. Then, the sector mold 20 fixed to the segment 14 moves toward the inner diameter side.

The vulcanization molding is performed after the mold clamping is completed as shown in FIGS. 3A to 3F. After completion of the molding, when the tire vulcanization mold 2 is opened by the reverse motion, the green tire GT becomes a pneumatic tire as a product.

Figure 4:
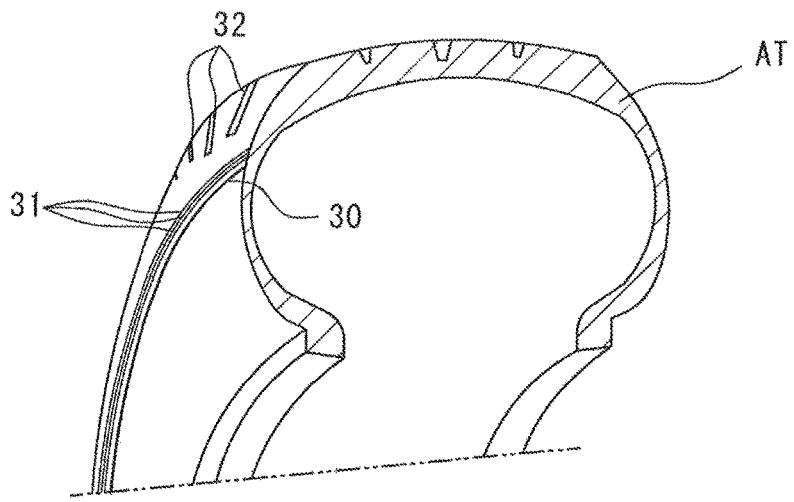
FIG. 4 is a cross-sectional perspective view of a pneumatic tire manufactured by the tire vulcanization mold of FIG. 1.

FIG. 4 shows the pneumatic tire AT manufactured as described above. The pneumatic tire AT includes an annular and linear mold fitting mark 30 formed by a fitting portion between the sector mold 20 and the upper mold 21 (or the lower mold 22), and a protrusion-shaped relief groove mark (molding mark) 31 provided in the vicinity of and the outside of the mold fitting mark 30. Here, the vicinity of and the outside of the mold fitting mark 30 refer to a range within, for example, 0.8 mm from the mold fitting mark 30 on the radially outer side of the pneumatic tire AT. The relief groove mark 31 is provided between the mold fitting mark 30 and the lug groove 32 in the radial direction of the pneumatic tire AT. In FIG. 4, three streaks of relief groove marks 31 are shown corresponding to the number of the relief grooves 20b in FIG. 2B. The number of the relief groove marks 31 to be formed is the same as the number of the relief grooves 20b. In addition, the relief groove mark 31 has a cross-sectional shape corresponding to that of the relief groove 20b. Therefore, for example, the relief groove mark 31 formed from the relief groove 20b with the triangular cross section of this embodiment have a chevron cross-sectional shape. In this way, the relief groove mark 31 is formed corresponding to the relief groove 20b with respect to dimensions, positions, etc. in addition to the cross-sectional shape.

According to the present embodiment, when the tire vulcanization mold 2 is closed, the rubber of the tire can escape to the relief groove 20b provided in the sector mold 20. Thus, it is possible to suppress the rubber from flowing to the fitting portion of the tire vulcanization mold 2. Therefore, it is possible to suppress the rubber from being caught by the tire vulcanization mold 2 and the poor appearance of the pneumatic tire can be prevented. Particularly, the recess 20b is provided in the sector mold 20 instead of the upper mold 21 (or the lower mold 22), thereby further suppressing the rubber from being caught. In detail, when the tire vulcanization mold 2 is closed as described above, the sector mold 20 moves inward in the radial direction of the tire while the upper mold 21 (or the lower mold 22) is fixed. Since the positional relationship between the upper mold 21 (or the lower mold 22) and the tire is fixed, the rubber of the tire flows toward the closing sector mold 20. Therefore, the recess 20b is provided in the sector mold 20, and the rubber escapes to the recess 20b, thereby suppressing the rubber from being caught in the fitting portion.

The depth of the relief groove 20b is defined, thereby preventing the rubber from being caught, and ensuring releasability of the tire vulcanization mold 2. Specifically, the relief groove 20b has a depth of 0.3 mm or more, whereby the rubber in an amount necessary for suppressing the rubber from being caught can escape. Further, the relief groove 20b has a depth of 0.5 mm or less, thereby preventing the rubber from deeply entering into the relief groove 20b and becoming difficult to be released from the tire vulcanization mold 2 when the mold 2 is opened.

The distance W1 between the relief groove 20b and the fitting portion is defined, thereby preventing durability of the tire vulcanization mold 2 from deteriorating, and the rubber from being caught. In detail, the relief groove 20b is 0.5 mm or more away from the fitting portion, whereby a sufficient thickness of the sector mold 20 in the vicinity of the fitting portion can be ensured. Therefore, it is possible to prevent durability of the sector mold 20 from deteriorating. Since the sector mold 20 comes into contact with the side molds 21, 22 at the fitting portion, and the sector mold is subjected to receive impact upon every molding, it is very effective to be able to prevent durability of the sector mold 20 in the vicinity of the fitting portion from deteriorating. In addition, the relief groove 20b is provided within a distance of 0.8 mm from the fitting portion, thereby more reliably suppressing the rubber from flowing to the fitting portion. If the relief groove 20b is provided extremely far from the fitting portion, the flow of the rubber toward the fitting portion cannot be suppressed, and it is impossible to provide the effect of preventing rubber from being caught in the fitting portion.

Further, the distance W2 between the relief groove 20b and the projection 20a is defined, thereby preventing durability of the tire to be manufactured from deteriorating, and sufficiently ensuring the area for arranging the relief groove 20b. Specifically, the relief groove 20b is 0.5 mm or more away from the projection 20a, thereby preventing a ridge line from being formed in the vicinity of the lug groove of the tire to be manufactured. If the relief groove 20b is provided extremely close to the projection 20a, the ridge line is formed in the vicinity of the lug groove in the tire. In that case, since the lug groove and the ridge line form a protruding and recessed relation, the abrasion rate of the tire is increased. Therefore, by preventing the formation of the relief groove 20b extremely close to the projection 20a, it is possible to prevent the abrasion resistance of the tire from deteriorating, that is, deterioration of durability of the pneumatic tire can be prevented. If the relief groove 20b is provided extremely far from the projection 20a, that is, if the relief groove 20b is provided extremely close to the fitting portion, the area for providing the relief groove 20b between the fitting portion and the projection 20a is decreased. Therefore, the relief groove 20b is provided within a distance of 0.8 mm from the projection 20a, whereby the sufficient area for arranging the relief groove 20b in the mold can be ensured.

Further, a relief groove 20b is provided so as to extend in a direction (circumferential direction of the tire) intersecting with the flow direction of the rubber (radial direction of the tire) to the fitting portion. Therefore, when the rubber flows into the fitting portion, it stretches across the relief groove 20b, so that the rubber can reliably escape to the relief groove 20b. Therefore, the flow of the rubber to the fitting portion can be suppressed, and it is possible to prevent the rubber from being caught. In particular, when the relief groove 20b is provided in the circumferential direction of the tire, it is easy to process the relief groove 20b.

As described above, in the pneumatic tire AT (see FIG. 4), since the biting of rubber during molding is suppressed, occurrence of poor appearance of the pneumatic tire AT is suppressed. Therefore, the aesthetic appearance of the tire is maintained.

Figure 5:
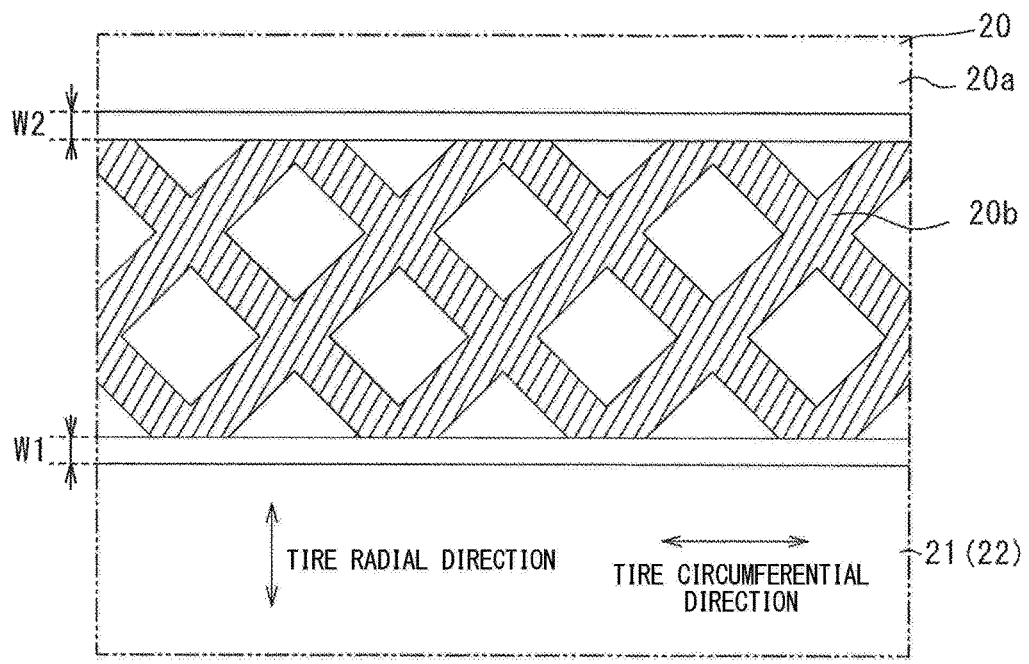
FIG. 5 is a front view of a recess showing a modification from FIG. 2B.

FIG. 5 shows a modification corresponding to FIG. 2B of the above embodiment. A plurality of relief grooves 20b of this modification extend in a direction intersecting with both the circumferential direction and the radial direction of the green tire GT, that is, the relief grooves 20b are provided in a mesh shape. The relief grooves 20b of the present modification extend so as to intersect with each of the circumferential direction and the radial direction at an angle of 45 degrees. The relief grooves 20*b* may intersect with each of the circumferential direction and the radial direction at an angle other than 45 degrees.

According to the present modification, when the relief groove 20*b* is provided in a mesh shape (including a knurl shape), the rubber can escape in various directions, and it is possible to more reliably suppress the rubber from being caught.

The form of the relief groove 20*b* is not limited to parallel streaks extending along the circumferential direction of the tire shown in FIG. 2B and a mesh shape which intersects with both the circumferential direction and the radial direction of the tire shown in FIG. 4. For example, the form of the relief groove 20*b* may be parallel streaks which intersect with the radial direction of the tire.

Although the specific embodiments of the present invention and its modifications have been described above, the present invention is not limited to the above-described embodiments, and various modifications can be made within the scope of the present invention. For example, an appropriate combination of descriptions of individual embodiments may be one embodiment of the present invention.

What is claimed is:

1. A tire vulcanization mold comprising:
   a sector mold divided into a plurality of pieces along a circumferential direction of a green tire, the sector mold configured to vulcanization mold a tread portion of the green tire into a predetermined shape; and
   a pair of side molds disposed on respective sides of the green tire so as to sandwich the green tire therebetween in an axial direction of the green tire, the side molds configured to vulcanization mold a side portion of the green tire into a predetermined shape,
   wherein the sector mold has a recess in a vicinity of a fitting portion between the sector mold and the side molds, and
   wherein the recess is a plurality of grooves in a mesh shape extending in a direction intersecting with both a circumferential direction and a radial direction of the green tire.

2. The tire vulcanization mold according to claim 1, wherein the recess has a depth of 0.3 mm or more and 0.5 mm or less.

3. The tire vulcanization mold according to claim 1, wherein the recess is provided away from the fitting portion by a distance of 0.5 mm or more and 0.8 mm or less.

4. The tire vulcanization mold according to claim 2, wherein the recess is provided away from the fitting portion by a distance of 0.5 mm or more and 0.8 mm or less.

5. The tire vulcanization mold according to claim 1,
   wherein the sector mold is provided with a projection for forming a lug groove on an outer circumferential surface of the green tire,
   wherein the recess is provided away from the projection by a distance of 0.5 mm or more and 0.8 mm or less.

6. The tire vulcanization mold according to claim 2,
   wherein the sector mold is provided with a projection for forming a lug groove on the outer circumferential surface of the green tire,
   wherein the recess is provided away from the projection by a distance of 0.5 mm or more and 0.8 mm or less.

7. The tire vulcanization mold according to claim 3,
   wherein the sector mold is provided with a projection for forming a lug groove on the outer circumferential surface of the green tire,
   wherein the recess is provided away from the projection by a distance of 0.5 mm or more and 0.8 mm or less.

8. The tire vulcanization mold according to claim 4,
   wherein the sector mold is provided with a projection for forming a lug groove on the outer circumferential surface of the green tire,
   wherein the recess is provided away from the projection by a distance of 0.5 mm or more and 0.8 mm or less.

9. A tire vulcanization mold comprising:
   a sector mold divided into a plurality of pieces along a circumferential direction of a green tire, the sector mold configured to vulcanization mold a tread portion of the green tire into a predetermined shape; and
   a pair of side molds disposed on respective sides of the green tire so as to sandwich the green tire therebetween in an axial direction of the green tire, the side molds configured to vulcanization mold a side portion of the green tire into a predetermined shape,
   wherein the sector mold has a recess in a vicinity of a fitting portion between the sector mold and the side molds,
   wherein the recess is provided away from the fitting portion by a distance of 0.5 mm or more and 0.8 mm or less, and
   wherein the recess is a groove extending annularly in a circumferential direction of the green tire.

\* \* \* \* \*